United States Patent [19]

Umehara et al.

[11] Patent Number: 5,004,915
[45] Date of Patent: Apr. 2, 1991

[54] STEERING ANGLE SENSOR APPARATUS

[75] Inventors: Keiichi Umehara; Hisashi Hirose; Kazuo Kono, all of Aichi, Japan

[73] Assignee: Kabushiki Kaisha Tokai Rika Denki Seisakusho, Aichi, Japan

[21] Appl. No.: 391,022

[22] Filed: Aug. 9, 1989

[30] Foreign Application Priority Data

Aug. 12, 1988 [JP] Japan .............................. 105976[U]

[51] Int. Cl.5 ............................................. G01D 5/34
[52] U.S. Cl. ............................ 250/231.14; 250/237 G
[58] Field of Search ...................... 250/231.14, 237 G; 341/13

[56] References Cited

U.S. PATENT DOCUMENTS 4,614,869 9/1986 Hoshino et al. ................ 250/231.14
4,661,698 4/1987 Cappio et al. .................. 250/231.14

Primary Examiner—David C. Nelms
Attorney, Agent, or Firm—Finnegan, Henderson, Farabow, Garrett, and Dunner

[57] ABSTRACT

Steering angle sensor apparatus includes a disc, a circuit substrate and a sensor contained within a single cover. The disc has indications such as slits or lines and is mounted on one of a steering shaft that rotates during a steering operation and a stationary member such as a steering column. The circuit substrate includes circuit parts and is mounted on the other one of the steering shaft and stationary member. A sensor includes at least one element mounted on the circuit substrate and senses the relative movement of the disc caused by the steering operation. The circuit substrate is positioned to confront a surface of the disc.

10 Claims, 3 Drawing Sheets

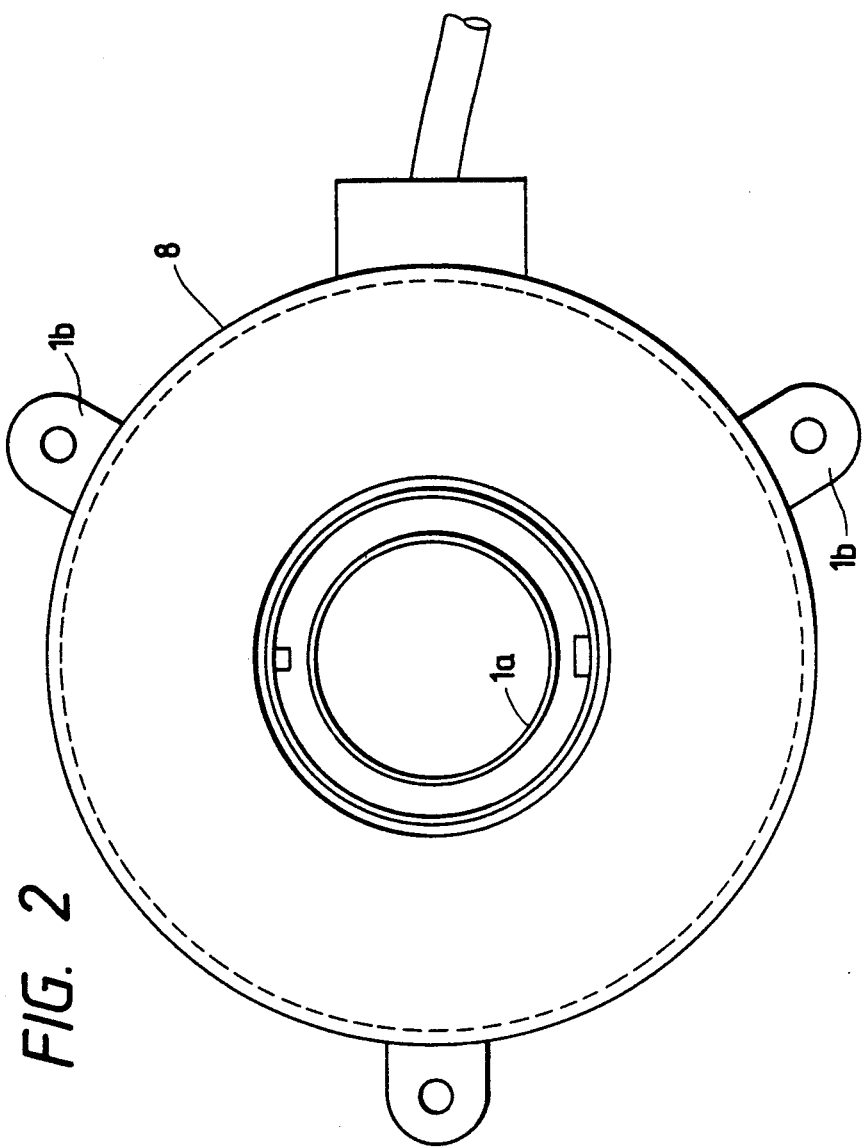
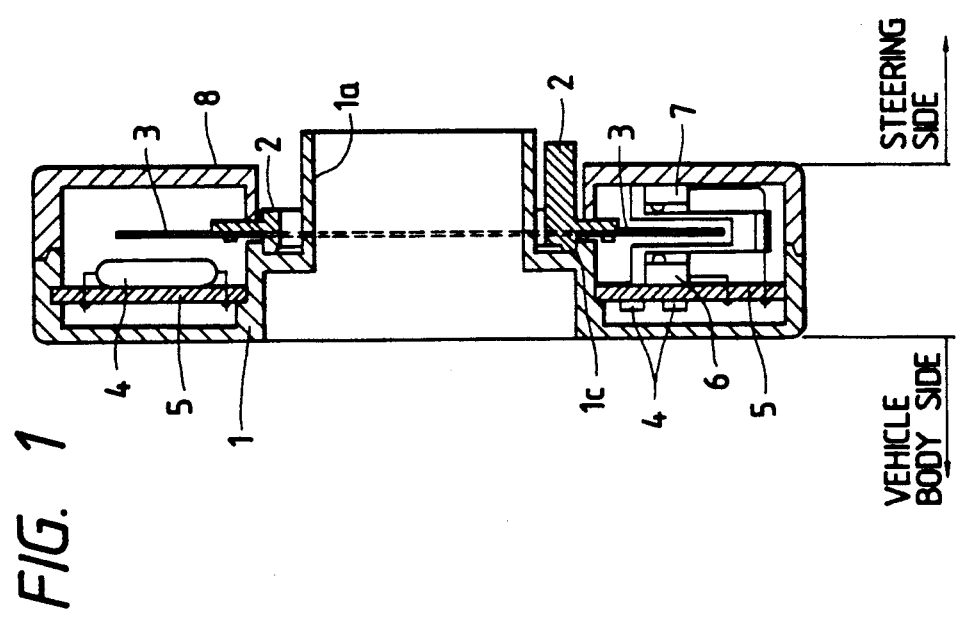

STEERING ANGLE SENSOR APPARATUS

FIELD OF THE INVENTION

The present invention relates to an improvement of a steering angle sensor, such as for an automobile, for detecting an angle of steering so as to control an electronically controlled suspension apparatus on the basis of the detected angle of steering.

BACKGROUND OF THE INVENTION

Examples of a conventional sensor, of a kind as described above, for photoelectrically reading a steering angle include the steering angle sensors illustrated in FIGS. 5 and 6. The steering angle sensor of FIG. 5 is provided, in a casing for a slip ring, for transmitting to a controller the states of various switches provided on a steering pad. The steering angle sensor of FIG. 6 is configured such that a rotating disc called a detecting disc and a sensor for reading the rotating disc are accommodated in a common casing.

In the steering angle sensor illustrated in FIG. 5, a disc 14 having slits 13 formed therethrough for indicating a steering angle is attached, together with a slip ring (not shown), to a position between upper and lower covers 11 and 12 of the slip ring.

A sensor 16 for photoelectrically reading slits 13 and a circuit substrate 17 having circuit parts therefor are housed in an enclosure 15 attached to upper and lower covers 11 and 12.

In operation, slits 13 of disc 14, which rotates with the rotation caused by steering, are read by sensor 16 so that an electronically controlled suspension apparatus can be controlled on the basis of the steering angle detected through the circuit.

In the steering angle sensor illustrated in FIG. 6, a disc, similar to the above described disc 14 of FIG. 5, is housed in a casing 20 provided separately from a slip ring, such as described above, so that the disc can be attached, at a hub 21 thereof, on the steering shaft. A sensor for reading slits of the disc, and circuit parts and a circuit substrate are housed in an enclosure 22 provided at one side of casing 20.

The steering angle sensor illustrated in FIG. 6 detects the steering angle in the same manner as performed by the sensor illustrated FIG. 5, so as to enable electronic control of suspension apparatus on the basis of steering angle.

In either of the foregoing conventional steering angle sensors, the sensor for reading the slits of the disc and enclosure 15 or 22 for housing the circuit of the sensor occupy a large volume at the side of upper and lower casings 11 and 12 or casing 20.

The above described conventional steering angle sensors are therefore disadvantageous in that, as a result of their use, the steering column becomes large and it is difficult to attach levers for light control, for a windshield wiper, etc.

SUMMARY OF THE INVENTION

An object of the present invention is to eliminate the foregoing disadvantage in the conventional steering angle sensor so as to provide a steering angle sensor in which the size thereof is not excessive across the diameter, while the thickness thereof along the direction of a steering shaft is increased, and in which a circuit portion can be mounted.

The present invention is directed to a steering angle sensor apparatus for attaining the foregoing objects. The steering angle sensor apparatus comprises: a disc attached to one of a steering shaft and a stationary member, the disc having indications such as slits or the like; a circuit substrate having circuit parts attached thereon, the circuit substrate being attached to the other one of the steering shaft and the stationary member to confront the rotating disc; a sensor, including an element attached to the circuit substrate, for reading the indications of the rotating disc; and a cover for covering the disc, the circuit substrate, and the sensor.

The steering angle sensor according to the present invention is arranged such that either the rotating disc or the circuit substrate rotates as the steering shaft rotates and the sensor reads a relative rotational angle.

Since the rotating disc is disposed to confront the circuit substrate on which the circuit parts and the sensor element are attached, the size in the direction across the diameter of the steering shaft is not increased. Further, the circuit substrate and the rotating disc are covered with the cover, and the steering angle sensor apparatus can be easily mounted.

BRIEF DESCRIPTION OF THE DRAWINGS

FIG. 1 is a sectional view showing a steering angle sensor constructed in accordance with a first embodiment of the present invention;

FIG. 2 is a front view of the first embodiment;

DESCRIPTION OF THE PREFERRED EMBODIMENTS

Figure 4:
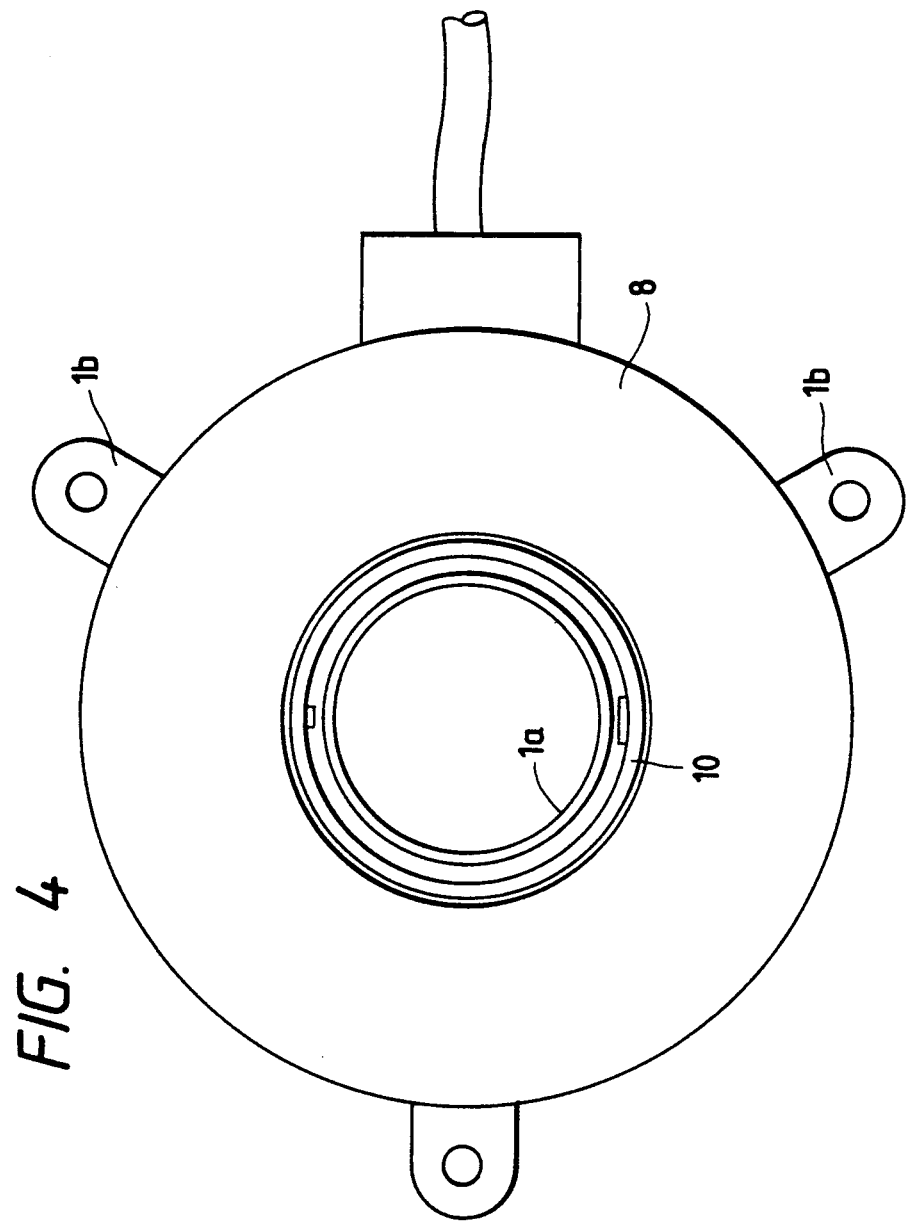
FIG. 4 is a front view of the second embodiment.

A steering angle sensor constructed in accordance with a first embodiment of the present invention will be described with reference to FIGS. 1 and 2.

The reference numeral 1 designates a casing provided, at its inner circumference, with a shaft hole 1a for loosely fitting a steering shaft therethrough, and provided, at its outer circumference, with attachment portions 1b for attaching casing 1 to a stationary member such as a steering column or the like.

A rotating body 2 is provided for connection to the steering shaft so as to rotate therewith and is rotatably mounted in an inner circumference 1c of casing 1. A rotating disc 3, having slits or the like provided therethrough for indicating a steering rotational angle, is affixed to rotating body 2.

A circuit substrate 5 having attached thereto, such as by soldering, required circuit parts 4 that comprise a steering angle sensor circuit, is mounted within casing 1 in opposing relationship to rotating disc 3. That is, substrate 5 confronts a surface of disc 3.

Further, a light emitting diode 6 is mounted to emit light to pass through the slits of rotating disc 3. A phototransistor 7 is mounted to receive light from light emitting diode 6 through the slits of rotating disc 3. Both light emitting diode 6 and phototransistor 7 are attached, such as by soldering, to circuit substrate 5. Light emitting diode 6 and phototransistor 7 thus serve as a sensor for reading indications, in the form of the slits, in rotating disc 3. A cover 8 for covering the rear of the foregoing elements is attached to casing 1.

Therefore, the assembly of the steering angle sensor can be easily performed by loosely inserting the steering shaft through shaft hole 1a of casing 1, connecting the steering shaft and rotating body 2 to each other, attaching the attachment portions 1b to the steering column, and attaching cover 8.

In operation, when the steering shaft is rotated, rotating disc 3 rotates together with the steering shaft, and light emitted from light emitting diode 6 so as to be received by phototransistor 7 is changed by the slits or the like of rotating disc 3. The steering rotational angle can then be detected by the sensor circuit by, for example, counting the slits.

Figure 3:
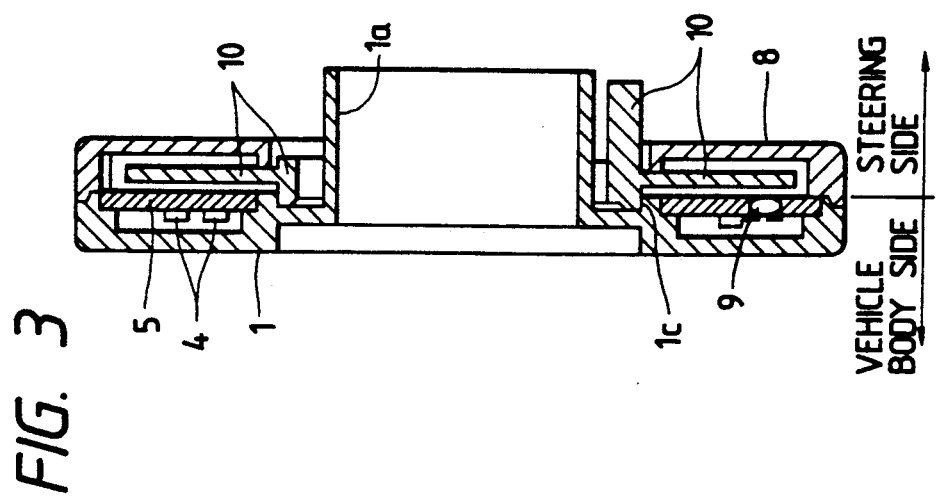
FIG. 3 is a sectional view showing a steering angle sensor constructed in accordance with a second embodiment of the present invention.
Figure 6:
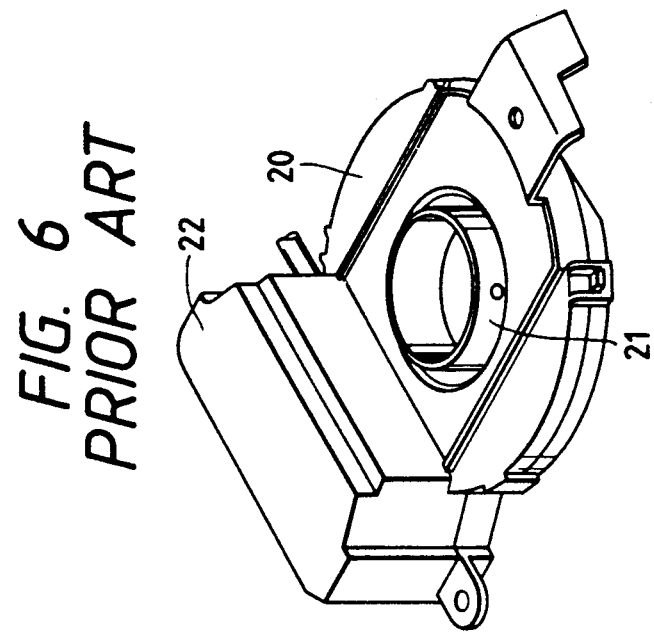
FIGS. 5 and 6 are perspective views showing conventional steering angle sensor apparatus.
Figure 5:
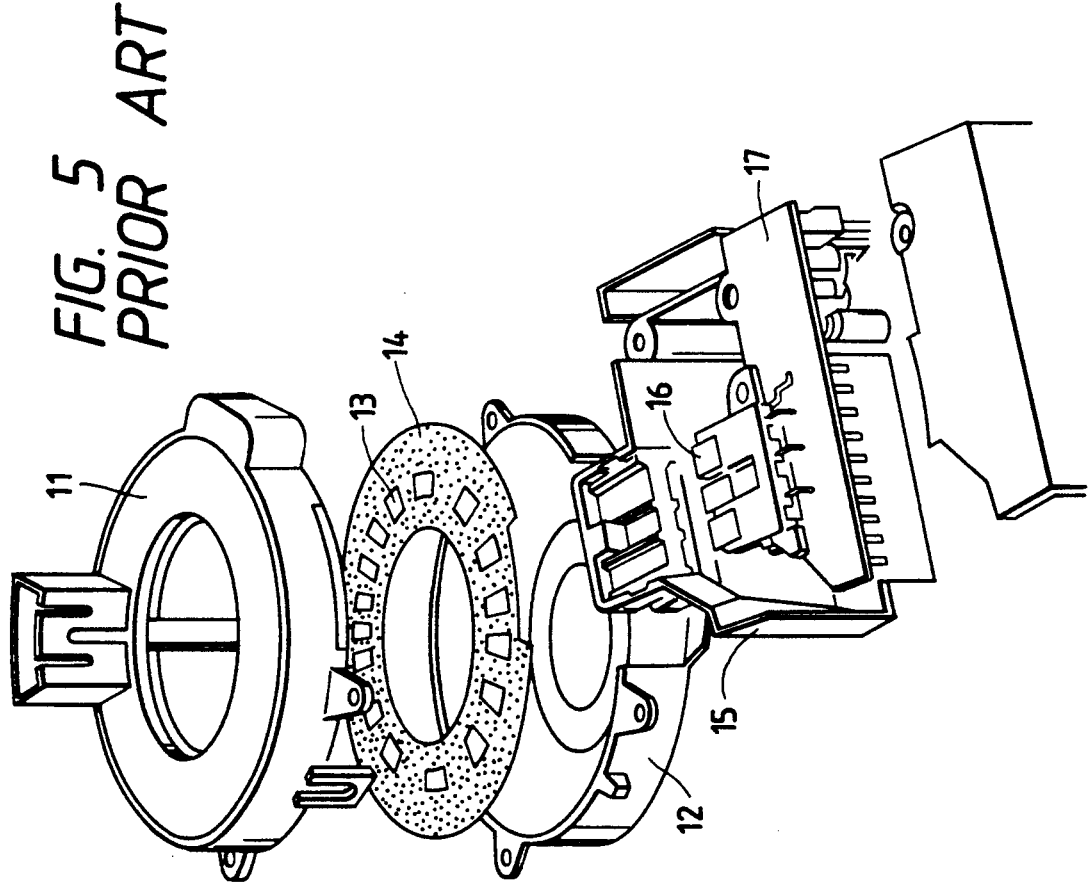

Next, a steering angle sensor constructed in accordance with a second embodiment of the present invention is described with reference to FIGS. 3 and 4.

In the second embodiment, a reflection-type photo-interrupter 9 is used as a sensor in place of light emitting diode 6 and phototransistor 7 of the foregoing embodiment. Further, in order to utilize reflected light, rotating body 2 and rotating disc 3 are formed integrally with each other so as to form a rotating disc body 10, and lines or the like for indicating a steering rotational angle are provided on one surface of rotating disc body 10.

The second embodiment is the same as the first embodiment except for the foregoing differences.

As described above, according to the present invention, the mounting of the steering angle sensor to a steering shaft and a steering column is easily accomplished. The rotating disc, the circuit substrate, the parts required for the circuit, and the sensor are covered with a cover so that dust or the like can be prevented from entering the inside and, as a result, the accuracy of the sensor can be maintained.

Further, since the circuit substrate and the rotating disc are disposed to confront each other, the size along the diameter direction of the steering shaft is not enlarged, and only the size in the axial direction along the steering shaft is increased.

Consequently, the shape of the steering column is not enlarged, and it is not difficult to attach a light controlling lever, a lever for controlling a windshield wiper, and the like.

While a steering angle sensor has been disclosed as including rotating disc 3 (first embodiment) or rotating body 10 (second embodiment) that rotates together with rotation of the steering shaft, the invention is not so limited. The steering angle sensor can instead be mounted so that disc 3 or body 10 is fixed relative to the steering shaft, while circuit substrate 5 together with light emitting diode 6 and phototransistor 7 (first embodiment) or photo-interrupter 9 (second embodiment) rotate with rotation of the steering shaft. As a result, a relative steering angle is detected.

Therefore, it is intended that the present invention not be limited to the particular embodiments disclosed, but that the present invention includes all embodiments falling within the scope of the appended claims.

What is claimed is:

1. A steering angle sensor apparatus for mounting on a vehicle steering apparatus which includes a steering shaft that rotates during a steering operation and a stationary member, said steering angle sensor apparatus comprising:

disc means, for attachment to one of the steering shaft and the stationary member, including indications for indicating steering rotational angle;

a circuit substrate, for attachment to the other one of the steering shaft and the stationary member, including circuit elements forming a steering angle sensor circuit;

sensor means, operatively coupled to said sensor circuit, for reading said indications, at least one element of said sensor means being attached to said circuit substrate;

cover means for enclosing said disc means, said circuit substrate and said sensor means; and said circuit substrate being positioned within said cover means to confront a surface of said disc means.

2. The steering angle sensor apparatus of claim 1 wherein said disc means comprises a disc;

said indications being slits in said disc; and said sensor means including a light emitting diode and a phototransistor positioned to confront one another across said disc, so that movement of said disc relative to said sensor means can be detected.

3. The steering angle sensor apparatus of claim 1 wherein said disc means comprises a disc;

said indications being lines marked on a surface of said disc; and said sensor means including a reflection-type photo-interrupter positioned to confront said disc surface, so that movement of said disc relative to said sensor means can be detected.

4. A steering angle sensor apparatus for mounting on a vehicle steering apparatus which includes a steering shaft that rotates during a steering operation and a stationary member, said steering angle sensor apparatus comprising:

a rotating member for attachment to the steering shaft for rotation therewith;

a disc, attached to said rotating member, including indications for indicating steering rotational angle;

a circuit substrate, for attachment to the stationary member, including circuit elements forming a steering angle sensor circuit;

sensor means, operatively coupled to said sensor circuit, for reading said indications and providing indication signals to said sensor circuit, at least one element of said sensor means being attached to said circuit substrate;

cover means for enclosing said rotating member, said circuit substrate and said sensor means; and said circuit substrate being positioned with said cover means to confront a surface of said disc.

5. The steering angle sensor apparatus of claim 4 wherein said rotating member is rotatably mounted within an inner circumference of said cover means.

6. The steering angle sensor apparatus of claim 4 wherein said indications are slits in said disc; and said sensor means includes a light emitting diode and a phototransistor positioned to confront one another across said disc to thereby detect movement of said disc relative to said sensor means.

7. The steering angle sensor apparatus of claim 4 wherein said indications are lines marked on a surface of said disc; and said sensor means includes a reflection-type photo-interrupter positioned to confront said disc surface to thereby detect movement of said disc relative to said sensor means.

8. A steering angle sensor apparatus for mounting on vehicle steering apparatus which includes a steering shaft that rotates during a steering operation and a stationary member, said steering angle sensor apparatus comprising:

disc means, for attachment to the stationary member, including indications for indicating steering rotational angle;

a circuit substrate, for attachment to the steering shaft, including circuit elements forming a steering angle sensor circuit;

sensor means, operatively coupled to said sensor circuit, for reading said indications and providing indication signals to said sensor circuit, at least one element of said sensor means being attached to said circuit substrate;

cover means for enclosing said disc means, said circuit substrate and said sensor means; and said circuit substrate being positioned within said cover means to confront a surface of said disc.

9. The steering angle sensor apparatus of claim 8 wherein said disc means comprises a disc;

said indications comprise slits in said disc; and said sensor means includes a light emitting diode and a phototransistor positioned to confront one another across said disc to thereby detect movement of said disc relative to said sensor means.

10. The steering angle sensor apparatus of claim 8 wherein said disc means comprises a disc;

said indications comprise lines marked on a surface of said disc; and said sensor means includes a reflection-type photo-interrupter positioned to confront said disc surface to thereby detect movement of said disc relative to said sensor means.

* * * * *

UNITED STATES PATENT AND TRADEMARK OFFICE
CERTIFICATE OF CORRECTION

PATENT NO. : 5,004,915
DATED : April 02, 1991
INVENTOR(S) : Keiichi Umehara et al.

It is certified that error appears in the above-identified patent and that said Letters Patent is hereby corrected as shown below:

Claim 4, Column 4, Line 48, change "with" to --within--; and

Claim 8, Column 4, Line 67, before "vehicle" insert --a--.

Signed and Sealed this

Ninth Day of February, 1993

Attest:

STEPHEN G. KUNIN

*Attesting Officer*   Acting Commissioner of Patents and Trademarks